(12) United States Patent
DiCato, Jr. et al.

(10) Patent No.: US 9,443,075 B2
(45) Date of Patent: Sep. 13, 2016

(54) INTERCEPTION AND POLICY APPLICATION FOR MALICIOUS COMMUNICATIONS

(71) Applicant: The MITRE Corporation, McLean, VA (US)

(72) Inventors: Stephen Ralph DiCato, Jr., Lynnfield, MA (US); Daniel Kenneth Fayette, Swansea, IL (US); Todd Aaron O'Boyle, Edwardsville, IL (US)

(73) Assignee: The Mitre Corporation, McLean, VA (US)

( * ) Notice: Subject to any disclaimer, the term of this patent is extended or adjusted under 35 U.S.C. 154(b) by 16 days.

(21) Appl. No.: 13/928,485

(22) Filed: Jun. 27, 2013

(65) Prior Publication Data
US 2015/0007250 A1   Jan. 1, 2015

(51) Int. Cl.
*H04L 29/06*  (2006.01)
*G06F 21/50*  (2013.01)

(52) U.S. Cl.
CPC .......... *G06F 21/50* (2013.01); *H04L 63/1416* (2013.01); *H04L 63/1425* (2013.01)

(58) Field of Classification Search
CPC .............. G06F 21/50; H04L 63/1425; H04L 63/1416; H04L 26/06
USPC .......................................... 726/1, 22, 24, 26
See application file for complete search history.

(56) References Cited

U.S. PATENT DOCUMENTS

| | | | |
|---|---|---|---|
| 7,016,980 B1 * | 3/2006 | Mayer ................. | H04L 41/0853 709/248 |
| 8,561,177 B1 * | 10/2013 | Aziz et al. ...................... | 726/22 |
| 2004/0030533 A1 * | 2/2004 | Hirose ................... | H04L 29/06 702/188 |
| 2008/0028463 A1 * | 1/2008 | Dagon et al. ................... | 726/22 |
| 2008/0155694 A1 * | 6/2008 | Kwon et al. .................... | 726/23 |

(Continued)

FOREIGN PATENT DOCUMENTS

EP    1 845 468 A1    10/2007

OTHER PUBLICATIONS

Dietrich et al, 2011, On Botnets That Use DNS for Command and Control, pp. 1-8.*

(Continued)

*Primary Examiner* — Christopher Brown
*Assistant Examiner* — Jenise Jackson
(74) *Attorney, Agent, or Firm* — Sterne, Kessler, Goldstein & Fox P.L.L.C.

(57) ABSTRACT

Disclosed herein are system, method, and computer program product embodiments for adapting to malware activity on a compromised computer system. An embodiment operates by detecting an adversary operating malware on a compromised system. A stream of network communications associated with adversary is intercepted. The stream of network communications includes a command and control channel of the adversary. The stream of network communications is accessed. An emulation of the command and control channel is provided. An analysis of the accessed stream of traffic is executed. A plurality of response mechanisms is provided. The plurality of response mechanisms is based in part on the analysis of the stream of network communications and a custom policy language tailored for the malware.

20 Claims, 4 Drawing Sheets

(56) References Cited

U.S. PATENT DOCUMENTS

| | | | |
|---|---|---|---|
| 2008/0184366 A1* | 7/2008 | Alperovitch et al. | 726/22 |
| 2008/0220740 A1* | 9/2008 | Shatzkamer et al. | 455/411 |
| 2008/0244694 A1 | 10/2008 | Neystadt et al. | |
| 2008/0256619 A1 | 10/2008 | Neystadt et al. | |
| 2008/0263133 A1* | 10/2008 | Le | G06F 13/385 709/203 |
| 2008/0313704 A1* | 12/2008 | Sivaprasad et al. | 726/2 |
| 2009/0080448 A1* | 3/2009 | Tarra et al. | 370/401 |
| 2009/0304025 A1* | 12/2009 | Boucadair et al. | 370/466 |
| 2011/0083180 A1 | 4/2011 | Mashevsky et al. | |
| 2011/0138041 A1* | 6/2011 | Petry et al. | 709/224 |
| 2011/0154492 A1* | 6/2011 | Jeong et al. | 726/23 |
| 2012/0151033 A1 | 6/2012 | Baliga et al. | |
| 2012/0158975 A1* | 6/2012 | Hogoboom et al. | 709/228 |
| 2012/0260342 A1 | 10/2012 | Dube et al. | |
| 2012/0271890 A1* | 10/2012 | Judge et al. | 709/206 |
| 2012/0278889 A1 | 11/2012 | El-Moussa | |
| 2013/0031599 A1 | 1/2013 | Luna et al. | |
| 2013/0097699 A1 | 4/2013 | Balupari et al. | |
| 2013/0167236 A1* | 6/2013 | Sick | G06F 21/552 726/24 |
| 2013/0263266 A1* | 10/2013 | Bojaxhi et al. | 726/23 |
| 2014/0282045 A1* | 9/2014 | Ayanam | G06F 3/0484 715/740 |
| 2015/0020199 A1* | 1/2015 | Neil | H04L 63/1433 726/23 |

OTHER PUBLICATIONS

Pott, Blackhole Your Malware, Aug. 13, 2010, pp. 1-3.*
Sans Institute, DNS Sinkhole, Aug. 7, 2010, pp. 1-42.*
Leder et al, Finding and Extracting Crypto Routines from Malware, 2009, IEEE, pp. 394-401.*
Milani et al, Prospex: Protocol Specification Extraction, 2009, IEEE, pp. 110-125.*
Blount, J.J. et al., "Adaptive Rule-Based Malware Detection Employing Learning Classifier Systems; A Proof of Concept," *35th IEEE Annual Computer Software and Applications Conference Workshop*, 2011, pp. 110-115.
Ingots, K. et al., "Modeling Modern Network Attacks and Countermeasures Using Attack Graphs," *Annual Computer Security Applications Conference*, 2009, 10 pages.
International Search Report directed to related International Patent Application No. PCT/US2014/032676, mailed Sep. 4, 2014; 9 pages.

* cited by examiner

INTERCEPTION AND POLICY APPLICATION FOR MALICIOUS COMMUNICATIONS

BACKGROUND

Malicious software (malware) is software used or created by attackers to disrupt computer operation, gather sensitive information, or gain access to private computer systems. Conventional security measures, such as anti-virus, intrusion detection/protection systems, and firewalls fail to completely stop malware from infecting computer systems and networks. Historically, network defenders respond to network intrusions by blocking IP addresses and domain names. These blocks fail to completely stop an attacker, while also blinding networking defenders and rendering damage assessment challenging.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for detecting and adapting to malware activity on a compromised computer system. Malware is controlled through a "command and control" or C2 channel. The command and control channel transmits commands that allow an attacker to control the compromised system. Through proper instrumentation, it is possible to enable a network defender to observe an attacker's C2 channel.

Figure 1:
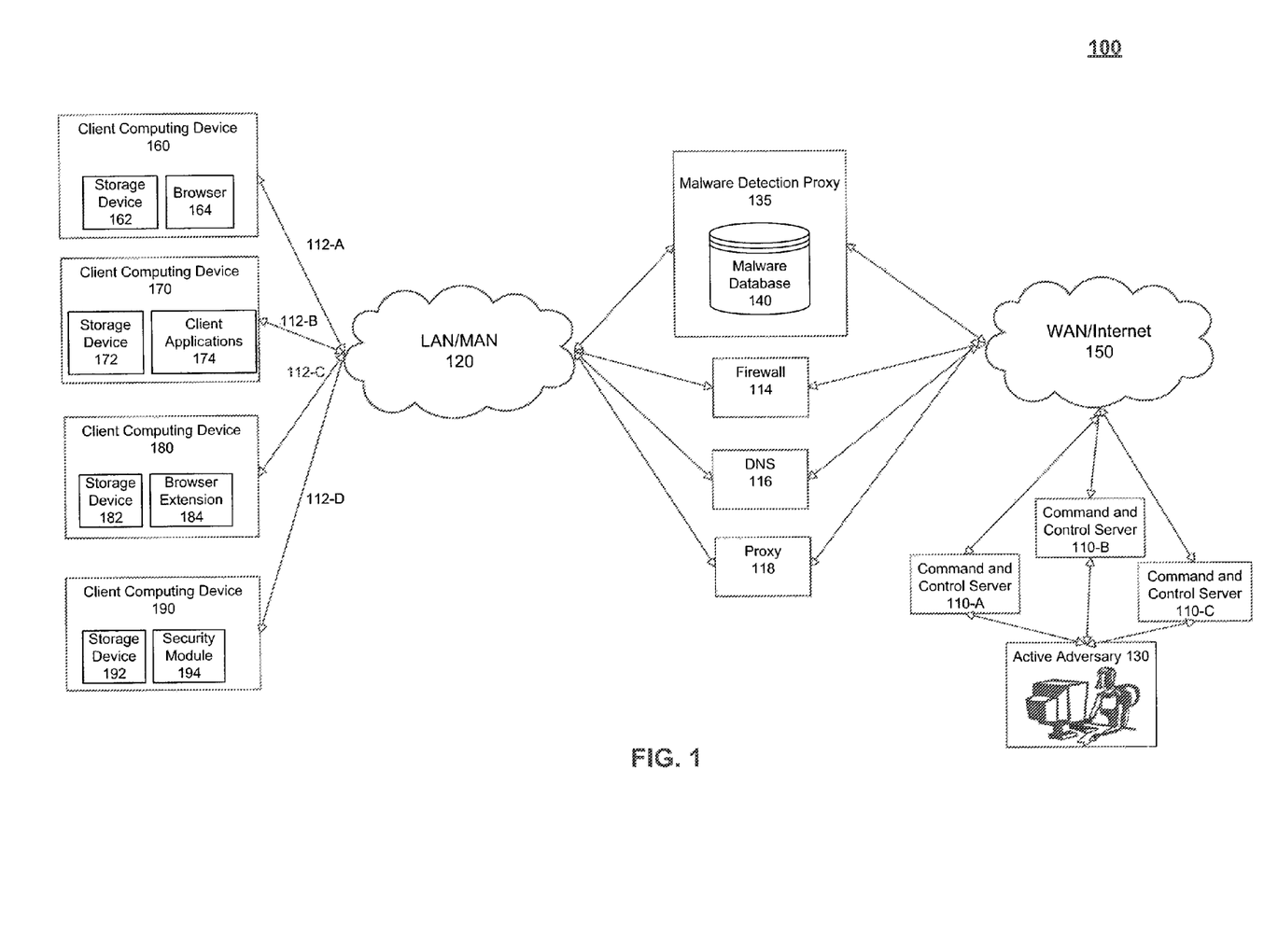
FIG. 1 is a block diagram of a malware control system, according to an example embodiment.

FIG. 1 is a block diagram illustrating a malware control system 100, which provides control of malware and an adversary 130. Malware control system 100 includes a malware proxy 135, client computing devices 160, 170, 180 and 190 and one or more adversary command and control servers 110-A, 110-B, 110-C. Client computing devices 160, 170, 180 and 190 and the one or more adversary command and control servers 240, 250, 260 are coupled via one or more networks LAN/MAN 120 or WAN/Internet 150. LAN/MAN 120 or WAN/Internet 150 may be any network or combination of networks that carry data communication. Such a network can include, but is not limited to, wired and wireless networks, a local area network, medium area network, and/or wide area network such as the Internet. For example LAN/MAN 120 can be a local area network or a metropolitan area network. A LAN is a computer network that interconnects computers in a limited area such as a home, school, computer laboratory, or office building using network media. In another embodiment, LAN/MAN 120 can be a metropolitan area network (MAN) which covers a city or a large campus, A MAN can communicatively couple a plurality of LANs. WAN/Internet 150 can be a wide area network (WAN) that expands across a large geographic area, such as a state, province or country. WANs can communicatively couple multiple smaller networks, such as LANs or MANs.

Client computing devices may be configured to communicate utilizing firewall 114, domain name server (DNS) 116 or proxy 118. Firewall 114 can include software or hardware that is configured to maintain network security. Firewall 114 can control downstream and upstream network traffic through the analysis of data packets. For example, firewall 114 can determine whether or not to allow the receipt of data packets by client computing devices 160, 170, 180 and 180 based on predetermined network security rules. DNS 116 is configured to translate or convert domain names provided by client computing devices 160, 170, 180 and 190 to a numerical internet protocol (IP) addresses associated with computing services and devices provided via WAN/Internet 150. Proxy server 118 is configured to emulate requests from client computing devices 160, 170, 180 and 190. For example, client computing devices 160, 170, 180 and 190 can communicate with proxy server 118 to request services, files, or other resources that may be available via WAN/Internet 150.

Client computing devices 160, 170, 180 and 190 communicate with adversary command and control servers 110 through a plurality of communication channels 112-A, 112-B, 112-C, and 112-D. Malware proxy 135 is configured to detect and control, mechanisms that allow for the detection of adversary 130. Although FIG. 1 illustrates malware proxy 135 as operating in between client computing devices 160, 170, 180, 190 and WAN/Internet 150, embodiments are not limited to this example configuration. In embodiments, malware proxy 135 may be coupled to LAN/MAN 120 or WAN/Internet 150, while client computing devices 160, 170, 180, 190 are communicatively coupled directly to WAN/Internet 150. Malware proxy 135 can then be configured to monitor the network activity of client computing devices 160, 170, 180 and 190 via WAN/Internet 150.

Client computing devices 160, 170, 180 and 190 are processor-based electronic devices that are manipulated by a user and are capable of requesting and receiving data from adversary command and control servers 240, 250, 260 over WAN/Internet 150 and communication channels 112. Examples of client computing devices 160, 170, 180 and 190 include personal computers, mobile communication devices and tablet computers. A user may utilize a browser of client computing devices 160, 170, 180 and 190 to request data from adversary command and control servers 240, 250, 260 over WAN/Internet 150 and LAN/MAN 120.

According to an embodiment, client computing device 160 includes a storage device 162 and a browser 164. Browser 164 may be any application software or program designed to enable users to access, retrieve and view documents and other resources on the Internet. For example, browser 164 can be a web browser. In another embodiment, client computing device 170 includes a storage device 172 and a client application 174. Client application 174 may be any application developed by a partner of an organization that is subjected to the compliance requirement of certain guidelines of the organization. In a further embodiment, client computing device 180 includes a storage device 182 and a browser extension 184, which may encompass plug-ins or add-ons that supplement functionalities of the browser and enhance the user interface in a way that is not directly related to the viewable content of web pages. In still another embodiment, client computing device 190 includes a storage device 192 and a security module 194 residing in a corporate network. Security module 194 may access streams of network communications of interest to be analyzed and evaluated by malware proxy system 100. Security module 194 may include software designed to prevent, detect and remove malware such as computer viruses, malicious Browser Help Objects, keyloggers, worms, trojans, adware, and spyware. Security module 192 generally can be run as a background program or process on client computing device 190 and initiates protection of the client computing device 190 when it is determined that the system is compromised.

Any of client computing devices 160, 170, 180 and 190 can be the object of a targeted attack. In the case of a targeted attack, adversary 130 (which may be fully or semi-automated or manual) desires to infect a specific target client computing device or system. The goal of adversary 130 can include extracting certain data from the target client computing device, disrupting, damaging or compromising the security/privacy of target client computing systems. Adversary 130 accomplishes this by infecting one or just a few client computing devices with malware which contacts a command and control server.

Often, but not always, an adversary attempts to remain concealed by using a waypoint located on a third party network resource called a command and control server. The command and control server assists in communication with the malware on a compromised client computing device via, a command and control channel. Additionally, attackers also use certain command and control servers as repositories of the malware. These command and control servers and channels may also be used to receive extracted data from the compromised client computing device. The command and control servers used by, adversary 130 are usually logically separate from the targeted client computing device.

The command and control server allows adversary 130 to remotely control the infected client computing devices. The control functionality can be used to infect other client computing devices on the network or search for documents or data of interest to the adversary. After the data of interest has been located, the adversary often gives instructions to extract the data.

Embodiments provide detection and control mechanisms that allow for the control of adversary 130 while adversary 130 is performing a targeted attack. Embodiments transparently control the adversary 130 (unknown to the adversary 130), by allowing a network defender utilizing malware proxy 135 to monitor the adversary 130 and any associated behavior related to the targeted attack. By monitoring the characteristics of adversary 130 and the targeted attack, a network defender can learn from control or limit any activities of adversary 130.

In general, in an embodiment, malware control system 100 operates as follows. Malware proxy 135 operates on a network boundary of malware control system 100. According to an embodiment, malware proxy 135 can identify the presence of adversary 130. Identification mechanisms used by malware proxy 135 can be based on conventional detection techniques such as network defense intelligence, signature based detection or automatic correlation of network traffic patterns.

According to an embodiment, in response to the detection of adversary 130, the system is configured to intercept a stream of network communications including a command and control channel of adversary 130. In another embodiment, the interception of the stream of network communications is transparent/unknown to adversary 130. For example, malware proxy 135 can intercept the stream of network communications from the network connection of adversary 130 and reroute the traffic to malware proxy 135. In an embodiment, malware proxy 135 can intercept and reroute network communications using a black-holing technique. For example, malware proxy 135 can provide and advertise a mock IP address associated with the client computing device which is the target of adversary 130. The mock IP address and the IP address of the client computing device are the same; however the mock IP address can have a higher priority or preference, according to an embodiment. In this way, the higher priority of the mock IP address allows for the network communications to be intercepted and re-routed to malware proxy 135 instead of the client computing device.

According to another embodiment, malware proxy 135 can intercept and route network communications using a Domain Name System (DNS) technique. DNS translates Internet domain and host names to IP addresses. DNS implements a distributed database to store the name and address information for all public hosts on the Internet. When a client computing device using a web browser initiates a request involving Internet host names, a DNS resolver contacts a DNS server (not illustrated) to determine the server's IP address. Malware proxy 135 is configured to mimic the DNS resolver and provide mock IP addresses. As discussed above, the mock IP address can be used to re-route malicious network communications of a targeted attack initiated by adversary 130. In an example, interception and re-routing of network communications can be accomplished using a software script which redirects DNS queries for the command and control channel of the adversary 130 or routs IP addresses for the command and control channel to malware proxy 135. The intercepting and re-routing techniques described above allows malware proxy 135 to emulate a command and control server and channel of adversary 130. Since adversary 130 is unaware of the interception and re-routing of the network communications, malware proxy 135 serves as a pseudo command and control server and channel. Thus, adversary 130 will continue the attempted targeted attack believing that the attack has not been discovered.

Once the network communications is intercepted and re-routed, malware proxy 135 is configured to analyze the intercepted network communications. In an embodiment, analysis of the intercepted network communications includes accessing the command and control channel of adversary 130. In general, the command and control channel of adversary 130 is encrypted. Encryption is often used by adversary 130 to mask a targeted attack and/or elude network defenders. In an encryption scheme, the command and control channel and network communications of the adversary 130 is encrypted using an encryption algorithm, turning it into ciphertext. Ciphertext cannot be decrypted without the proper key or password. Decryption, the inverse of encryption, is the process of turning ciphertext into plaintext. Malware proxy 135 decrypts and decodes the command and control channel of adversary 130 in order to determine information related to the targeted attack. By decrypting and decoding the command and control channel of adversary 130, a network defender is privy to information such as the commands adversary 130 is issuing to Client Computing Devices 160, 170, 180 and 190. Additionally a network defender then has the ability to monitor adversary 130 while they are attempting a targeted attack in order to understand the nature and characteristics of the targeted attack.

According to an embodiment, malware proxy 135 is configured to log information related to adversary 130 and the nature of the targeted attack. Such information can be logged in malware database 140, for example. Malware proxy 135 is also configured to analyze the logged information in order to understand the characteristics of the attack and adversary 130. For example, by analyzing the logged information, a network defender is able to determine what information adversary 130 may be attempting to steal or how adversary 130 is otherwise attempting to compromise the client computing device.

By reverse engineering the stream of data, malware proxy 135 is configured to decode the protocol used by adversary 130. By reverse-engineering the protocol of the malware, a network defender is able to understand how the malware is used to control or attack the compromised client computing devices. Once the network protocol is reverse-engineered, a plurality of response mechanisms can be used to control the activities of adversary 130. The plurality of response mechanisms can be based on a custom policy language developed by the network defender. For example, if it is determined that the malware of adversary 130 is attempting to steal data, a response mechanism can include a policy which mandates that only certain files are downloadable by adversary 130. The network defender can determine the response mechanism that should be initiated in response to the malware of adversary 130. Response mechanisms and associated policies will be discussed in additional detail below with FIG. 2. In this way, the response mechanisms allows a network defender to continue to observe and adapt to adversary 130, without alerting adversary 130 that the attempted targeted attack has been detected. Thus, a network defender has the ability to learn from the characteristics of the malware and the behavior of adversary 130 in order to produce improved operational response to adversarial actions in real-time.

Malware control system 100 can be software, firmware, or hardware or any combination thereof in a computing device. System 100 can be implemented on or implemented with one or more client computing devices. A client computing device can be any type of computing device having one or more processors and memory. For example, a client computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A client computing device may include a communication port or I/O device for communicating over wired or wireless communication link(s). A further example of a computing device is described with respect to FIG. 4 below.

Figure 2:
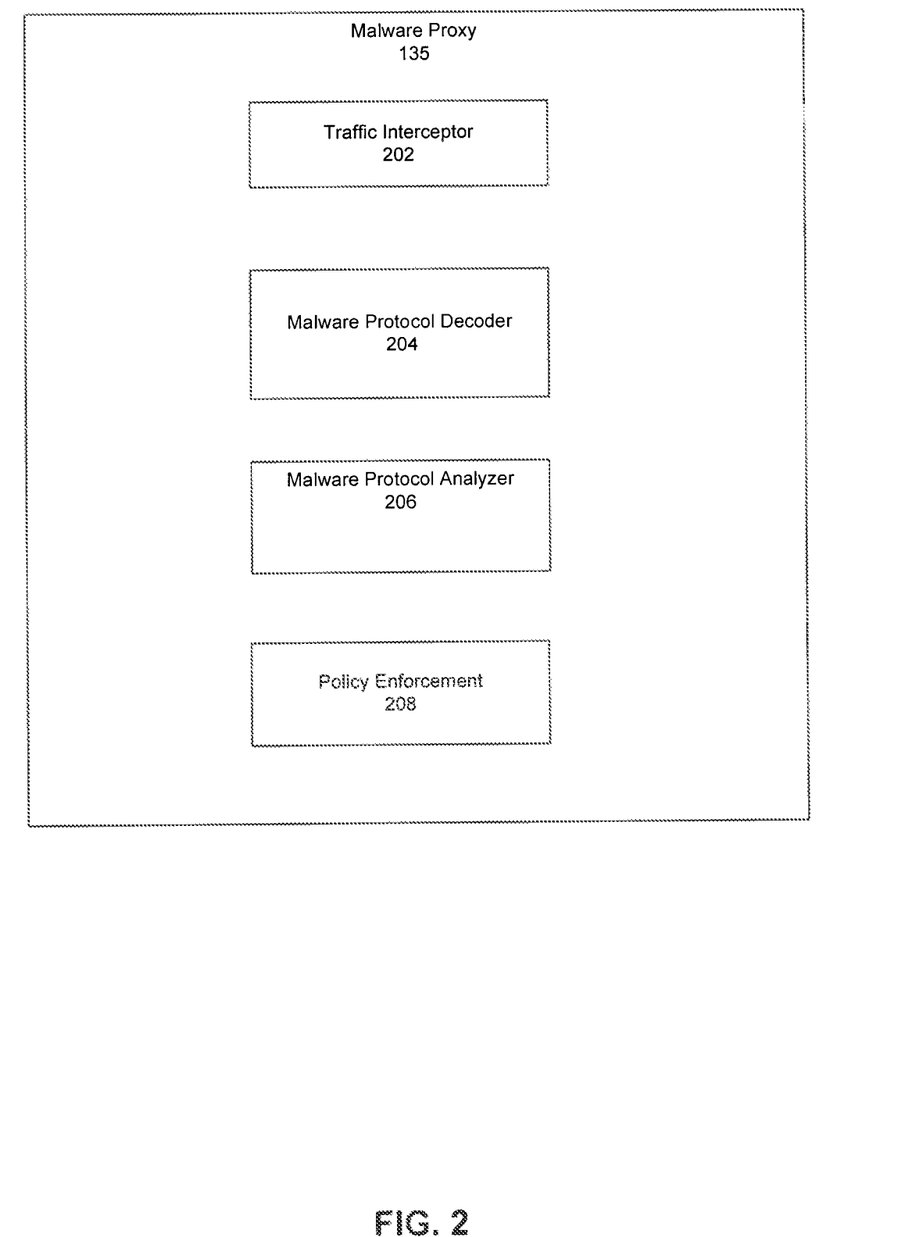
FIG. 2 is a block diagram of a malware proxy, according to an example embodiment.

FIG. 2 is a block diagram of a malware proxy, according to an example embodiment. Malware proxy 135 includes traffic interceptor 202, data malware protocol decoder 204, malware analyzer 206 and policy enforcement 208.

Traffic interceptor 202 is configured to intercept the activity of an adversary. For example, an adversary may be engaging in a targeted attack of a client computing device or system. During a targeted attack, an adversary communicates with the compromised system via a command and control channel. The behavior and presence of an adversary can be controlled using a number of techniques. For example, patterns of known-bad traffic can be an indicator of the presence of an adversary, indicating to network defenders a response needs to be taken.

Upon interception of an adversary by malware interceptor 202, malware protocol decoder 204 is configured to intercept a stream of network communications including a command and control channel of the adversary. In an embodiment, the interception of the stream of network communications is transparent/unknown to the adversary. For example, malware protocol decoder 204 can be configured to intercept the network communications from the network connection of the adversary and reroute the traffic using a black-holing technique. Malware protocol decoder 204 can create a mock protocol, port and IP address which is the equivalent of the address associated with the target of the adversarial attack. Using this mock address, the network routes the traffic to the malware interceptor 202. Since the intercepted traffic includes the command and control channel of the adversary, traffic interceptor 202 is responsible for emulating the command and control channel. Emulation of the command and control channel is crucial, as it provides for detection of the presence of the adversary without alerting the adversary.

Malware protocol analyzer 206 is configured to analyze the intercepted network communications including accessing the command and control channel of the adversary. Generally, the command and control channel of the adversary is encrypted, because the adversary does not want be discovered. Thus, malware analyzer 206 is configured to decode the network communications and identify information such as the identity/location of the adversary. Furthermore, malware analyzer 206 provides a network defender with monitoring capabilities of the adversary while they are attempting a targeted attack and are active within the compromised system. This provides the network defender with an increased understanding of the nature and characteristics of the targeted attack.

Policy enforcement 208 is configured to provide a plurality of response mechanisms according to an embodiment. The plurality of response mechanisms dictate what an adversary is do while on a compromised system. Once decoding of the command and control channel of the adversary is accomplished by malware analyzer 206, policy enforcement 208 can reverse engineer the protocol of the malware run by the adversary. Based on the protocol used by the malware, the network defender can launch a custom policy language tailored to the malware and protocol. For example, an analysis of the malware can determine the initial command malware will send when it initializes. Once a network defender identifies that an adversary is utilizing a specific type of malware, the network defender can launch custom responses tailored to the adversary. For example, the custom policy language and subsequent responses may provide response mechanisms or policies such as "Never allow the adversary to download files" or "Only allow the adversary to search a certain portion of the website." A custom policy language can be used to transparently control the activities of the adversary while also allowing the network defender to monitor and adapt to the adversary and associated malware. In this manner, network defenders can use the period of time that an adversary resides on a compromised system in order to monitor and collect information regarding the attack. This allows the network defender to provide real-time response mechanisms to an adversary while they are engaged in a targeted attack on a compromised system.

Overview of the Method

Figure 3:
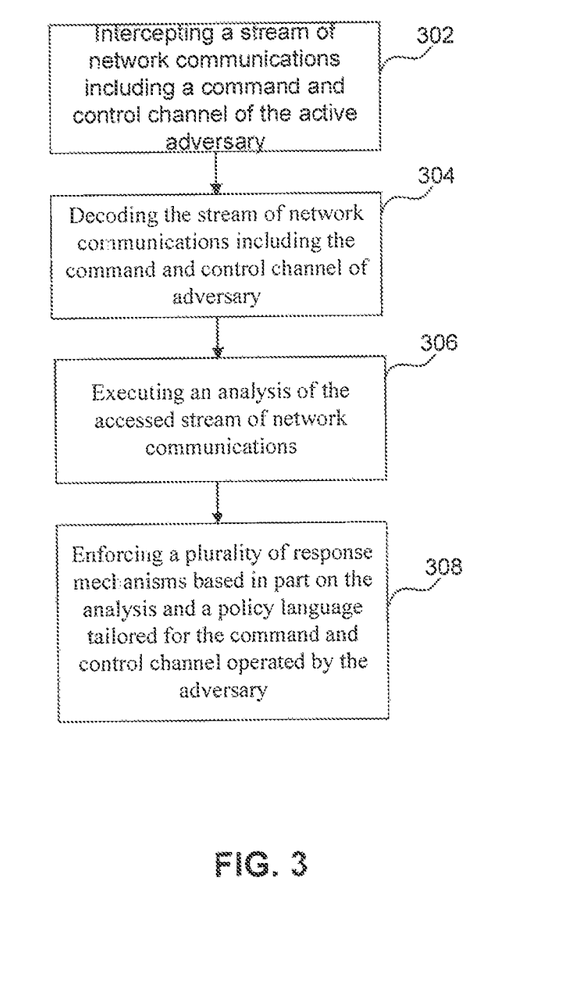
FIG. 3 is a flowchart illustrating a process for a malwire control system, according to an example embodiment.

FIG. 3 is a flowchart illustrating a process for a malware control system, according to an example embodiment.

At step 302, a stream of network communications including a command and control channel of the adversary is intercepted. For example, step 302 may be performed by malware proxy 135 of malware control system 100. A stream of network communications can be intercepted in response to or while an adversary is operating malware on a compromised system. An adversary can be detected using conventional malware detection mechanisms. As discussed above, these mechanisms can range from signature based detection to automatic correlation of network traffic patterns.

According to an embodiment, the stream of network communications can be intercepted using a black-holing or DNS technique. For example, a mock IP address can be generated which is used to re-route the stream of network communications. The mock IP address appears to an adversary as the same IP address associated with the compromised system. The mock IP address is given a higher priority and as a result, the stream of network communications is re-routed to the mock IP address instead of the target of the adversary. The interception and re-routing of the network communications is transparent to an adversary.

At step 304, the stream of network communications including the command and control channel of the adversary is decoded. For example, step 306 may be performed by malware proxy 135 of malware control system 100. The stream of traffic is accessed in order to provide an emulation of an adversary-specific command and control channel. Once the network communications is intercepted and re-routed, malware proxy 135 is configured to analyze the intercepted network communications. In an embodiment, analysis of the intercepted network communications includes accessing and decoding the encrypted command and control channel of the adversary. Decoding of the command and control channel of the adversary allows for the identification of information related to the targeted attack. By decoding the command and control channel of an adversary, a network defender is aware of information such as the identity/location of the adversary. Additionally a network defender then has the ability to monitor the adversary while they are attempting a targeted attack in order to understand the nature and characteristics of the targeted attack. In this way, the analyzed information can be used to mimic the command and control channel of the adversary. Thus, the adversary believes they are still operating in a concealed manner, although that is not the case.

At step 306, an analysis of the routed stream of traffic including the command and control channel is performed. For example, step 308 may be performed by malware proxy 135 of malware control system 100. The analysis of the routed stream of traffic occurs in real-time while the adversary is engaging in a targeted attack, according to an embodiment. The activity of the adversary and the associated malware can be monitored and logged for real-time or post-mortem responses. The protocol of the malware is reverse-engineered and this provides the network defender the ability to understand how the adversary is using the malware to control or attack the compromised client computing devices or systems.

At step 308, a plurality of response mechanisms is enforced based in part on the analysis and a policy language tailored for the command and control channel operated by the adversary.

For example, step 310 may be performed by malware proxy 135 of malware control system 100. Once control over the command and control channel of the adversary is established by the network defender, a number of responses can be used to deal with the adversary. For example, based on the protocol used by the malware, a network defender can utilize a custom policy language to handle the adversary. The custom policy language may provide response mechanisms or policies such as "Never allow the adversary to download files," "Only allow the adversary to search a certain set of locations" or "Replace all downloaded files with a predetermined file". A custom policy language can be used to transparently control the activities of the adversary while also allowing the network defender to monitor and adapt to the adversary and associated malware. In this way, network defenders can use the time that an adversary resides on a compromised system in order to monitor and collect information regarding the attack. Additionally, network defenders are provided with an increased understanding of the attack which leads to improved operational responses to an adversary.

Example Computer System

Figure 4:
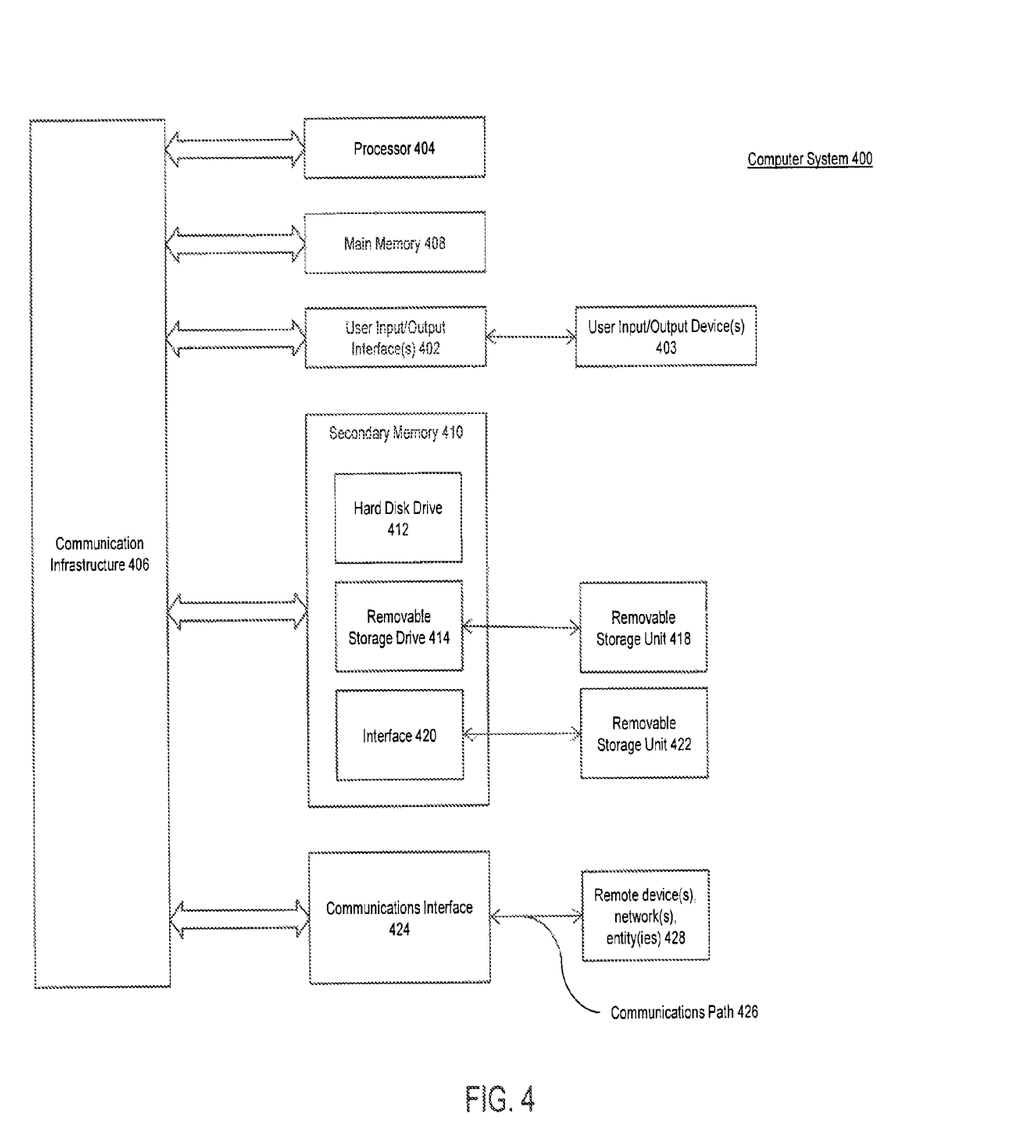
FIG. 4 is an example computer system useful for implementing various Embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired, and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for intercepting network communications, comprising:
    intercepting, by a computing device, a stream of network communications from an adversary attempting to perform a targeted attack on a client device;
    decoding, by the computing device, the stream of network communications including a command and control channel of the adversary;
    reverse-engineering a protocol of the command control channel of the adversary based on the decoding;
    utilizing the reverse-engineering protocol to produce an emulated command and control server and an emulated command and control channel of the adversary, wherein the emulated command and control server serves as a routing device between the adversary and the client device;
    controlling the decoded stream of network communications by routing the decoded stream of network communications through the emulated command and control server and over the emulated command and control channel to the client device, wherein
    the controlling is based on an enforcement of a plurality of response mechanisms that are dependent on the reverse-engineering protocol and a policy language tailored for activities of the adversary;
    initiating a response mechanism from the plurality of response mechanisms; and
    seeking to influence the activities of the adversary based on the initiated response mechanism, wherein the adversary is unaware of the controlling and the controlling includes manipulating the stream of network communications.

2. The method of claim 1, the reverse-engineering further comprising:
    intercepting the stream of network communications using a black-holing technique; and
    monitoring the reverse-engineered protocol to determine behavioral characteristics of the malware, command and control channel, and actions of the adversary.

3. The method of claim 2, further comprising:
    logging portions of the decoded stream of network communications for real-time and post-mortem analysis; and
    logging the behavioral characteristics of the malware, the command and control channel, and the adversary.

4. The method of claim 1, wherein the seeking to influence includes controlling activities of the adversary.

5. The method of claim 1 wherein the intercepting occurs at a network boundary of a compromised system.

6. The method of claim 1, further comprising:
identifying the adversary using at least one of a signature-based detection technique or a heuristic-based detection technique.

7. The method of claim 1, wherein the intercepting of the stream of traffic is performed using at least one of a domain name server (DNS) or Internet Protocol (IP) black-holing technique.

8. A system, comprising:
a memory; and
at least one processor coupled to the memory and configured to:
intercept a stream of network communications from an adversary attempting to perform a targeted attack on a client device;
decode the stream of network communications including a command and control channel of the adversary;
reverse-engineer a protocol of the command control channel of the adversary based on the decoded stream of network communications;
utilize the reverse-engineered protocol to produce an emulated command and control server and an emulate command and control channel of the adversary, wherein the emulated command and control server serves as a routing device between the adversary and the client device;
control the decoded stream of network communications by routing the decoded stream of network communications through the emulated command and control server and over the emulated command and control channel to the client device, wherein the controlling is based on an enforcement of a plurality of response mechanisms that are dependent on the reverse-engineered protocol and a policy language tailored for activities of the adversary;
initiate a response mechanism from the plurality of response mechanisms; and
seek to influence the activities of the adversary based on the initiated response mechanism, wherein the adversary is unaware of the controlling and the controlling includes manipulating the stream of network communications.

9. The system of claim 8, wherein to reverse-engineer the protocol, the at least one processor further configured to:
intercept the stream of network communications using a black-holing technique; and
monitor the reverse-engineered protocol to determine behavioral characteristics of the malware, command and control channel, and actions of the adversary.

10. The system of claim 9, the at least one processor further configured to:
log portions of the decoded stream of network communications for real-time and post-mortem analysis; and
log the behavioral characteristics of the malware, the command and control channel, and the adversary.

11. The system of claim 8, wherein to seek to influence the at least one processor is configured to control activities of the adversary.

12. The system of claim 8, wherein the at least one processor is located at a network boundary of the compromised system.

13. The system of claim 8, the at least one processor further configured to:
identify the adversary using at least one of a signature-based detection technique or a heuristic-based detection technique.

14. The system of claim 8, the at least one processor further configured to intercept the stream of network communications using at least one of a domain name server (DNS) technique or a black-holing technique.

15. A non-transitory tangible computer-readable device having instructions stored thereon that, when executed by at least one computing device, causes the at least one computing device to perform operations comprising:
intercepting a stream of network communications from an adversary attempting to perform a targeted attack on a client device;
decoding the stream of network communications including a command and control channel of adversary;
reverse-engineering a protocol of the command control channel of the adversary based on the;
utilizing the reverse-engineering protocol to produce an emulated command and control server and an emulated command and control channel of the adversary, wherein the emulated command and control server serves as a routing device between the adversary and the client device;
controlling the decoded stream of network communications by routing the decoded stream of network communications through the emulated command and control server and over the emulated command and control channel to the client device, wherein the controlling is based on an enforcement of a plurality of response mechanisms that are dependent on the reverse-engineering protocol and a policy language tailored for activities of the adversary;
initiating a response mechanism from the plurality of response mechanisms; and
seeking to influence the activities of the adversary based on the initiated response mechanism, wherein the adversary is unaware of the controlling and the controlling includes manipulating the stream of network communications.

16. The non-transitory computer-readable device of claim 15, the operations further comprising:
intercepting the stream of network communications using a black-holing technique; and
monitoring the reverse-engineered protocol to determine behavioral characteristics of the malware, command and control channel, and actions of the adversary.

17. The non-transitory computer-readable device of claim 16, the operations further comprising:
logging portions of the decoded stream of network communications for real-time and post-mortem analysis; and
logging the behavioral characteristics of the malware, the command and control channel, and the adversary.

18. The non-transitory computer-readable device of claim 15, wherein the seeking to influence includes controlling activities of the adversary.

19. The non-transitory computer-readable device of claim 15, the operations further comprising:
identifying the adversary using at least one of a signature-based detection technique or a heuristic-based detection technique.

20. The non-transitory computer-readable device of claim 15, wherein the intercepting of the stream of traffic is performed using at least one of a domain name server (DNS) technique or a black-holing technique.

* * * * *